(12) United States Patent
Craik

(10) Patent No.: US 11,061,703 B2
(45) Date of Patent: Jul. 13, 2021

(54) MANAGED RUNTIME DATA MARSHALING FOR NATIVE CODE ACCESS USING A THREAD LOCAL NATIVE BUFFER

(71) Applicant: International Business Machines Corporation, Armonk, NY (US)

(72) Inventor: Andrew James Craik, North York (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 61 days.

(21) Appl. No.: 16/244,402

(22) Filed: Jan. 10, 2019

(65) Prior Publication Data

US 2020/0225967 A1 Jul. 16, 2020

(51) Int. Cl.
*G06F 9/46* (2006.01)
*G06F 9/455* (2018.01)
*G06F 9/54* (2006.01)

(52) U.S. Cl.
CPC ........ *G06F 9/4552* (2013.01); *G06F 9/45558* (2013.01); *G06F 9/544* (2013.01); *G06F 2009/45583* (2013.01)

(58) Field of Classification Search
CPC ... G06F 9/45552; G06F 9/45558; G06F 9/544
See application file for complete search history.

(56) References Cited

U.S. PATENT DOCUMENTS

| 7,730,473 | B2 | 6/2010 | Mountain et al. |
| 9,600,546 | B2 | 3/2017 | Shivarudraiah et al. |
| 2002/0066087 | A1 | 5/2002 | Long et al. |
| 2005/0018618 | A1* | 1/2005 | Mualem .............. H04L 63/1458 370/252 |
| 2009/0089764 | A1* | 4/2009 | Lai ........................ G06F 9/4484 717/143 |
| 2010/0229159 | A1* | 9/2010 | Odaira .................... G06F 9/449 717/128 |
| 2014/0282391 | A1 | 9/2014 | Doughan et al. |
| 2015/0193904 | A1* | 7/2015 | Vermeulen .............. G06F 9/542 345/522 |
| 2015/0278528 | A1 | 10/2015 | Xing et al. |

OTHER PUBLICATIONS

Bryan Carpenter et al., Object Serialization for Marshalling Data in Java Interface to MPI, NPAC at Syracuse University Syracuse, NY 13244, 1999.
Singaram Subramanian, Marshalling/Unmarshalling Java Objects: Serialization VS Externalization, Java Zone, Feb. 1, 2012.

* cited by examiner

*Primary Examiner* — Camquy Truong
(74) *Attorney, Agent, or Firm* — Garg Law Firm, PLLC; Rakesh Garg; Michael O'Keefe

(57) ABSTRACT

A portion of a native memory is configured as a buffer within a native execution environment. Execution of a managed runtime code is initiated by a virtual machine. Data from a managed runtime memory of the virtual machine is marshaled by the virtual machine into the buffer. Control of execution is transferred from the managed runtime code to the native code. The native code is executed. The native code operates directly upon the marshaled data in the buffer.

17 Claims, 7 Drawing Sheets

MANAGED RUNTIME DATA MARSHALING FOR NATIVE CODE ACCESS USING A THREAD LOCAL NATIVE BUFFER

TECHNICAL FIELD

The present invention relates generally to a method, system, and computer program product for managed runtime data marshaling. More particularly, the present invention relates to a method, system, and computer program product for managed runtime data marshaling for native code access using a thread local native buffer.

BACKGROUND

Modern programming languages are increasingly implemented using some form of virtualized execution to improve performance and allow for automated memory management in the form of garbage collection. Managed runtime code is computer code that requires and will execute only under the management of a virtual machine. An example of a managed runtime code programming language is Java™ (a trademark of Oracle Corporation). For Java™ applications code must be executed on a virtual machine such as a Java™ virtual machine (JVM). Often it is necessary to interface programs running in the language's virtualized environment with native code running on legacy native systems. Native code is computer programming code that is complied to run with a particular processor and set of instructions native to the processor without the support of a virtual machine.

SUMMARY

The illustrative embodiments provide a method, system, and computer program product. An embodiment of a method includes configuring a portion of a native memory as a buffer within a native execution environment. The embodiment further includes initiating, by a virtual machine, execution of a managed runtime code. The embodiment further includes marshaling, by the virtual machine, data from a managed runtime memory of the virtual machine into the buffer. In the embodiment, the marshaling includes converting the data in the managed runtime heap to match a calling convention of a native code. The embodiment further includes transferring control of execution from the managed runtime code to the native code, and executing the native code. In the embodiment, the native code operates directly upon the marshaled data in the buffer.

In another embodiment, the marshaling includes converting the data in the managed runtime memory to match a calling convention of a native code. In another embodiment, the managed runtime memory includes a managed runtime heap.

Another embodiment further includes detecting, by the virtual machine, a call to the native code within the managed runtime code. In another embodiment, the detection is performed by a just-in-time compiler of the virtual machine.

Another embodiment further includes transferring control of execution from the native code to the managed runtime code.

In another embodiment, the marshaling of the data from the managed runtime memory into the buffer further includes constructing an execution stack frame within the buffer, the execution stack frame including the marshaled data. Another embodiment further includes setting a stack pointer to one or more of a start of the buffer or an end of the buffer.

In another embodiment, the managed runtime memory includes an application programming interface (API) associated therewith, the API facilitating the marshaling of data between the virtual machine and the buffer.

Another embodiment further includes writing second data to a native portion of the buffer by the native code, and calling the managed runtime code from the native code. In the embodiment, the managed runtime code uses the API to at least one of read the second data or write to the second data.

In another embodiment, the native code executes within a native execution environment. In another embodiment, the managed runtime code executes within a virtualized execution environment.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
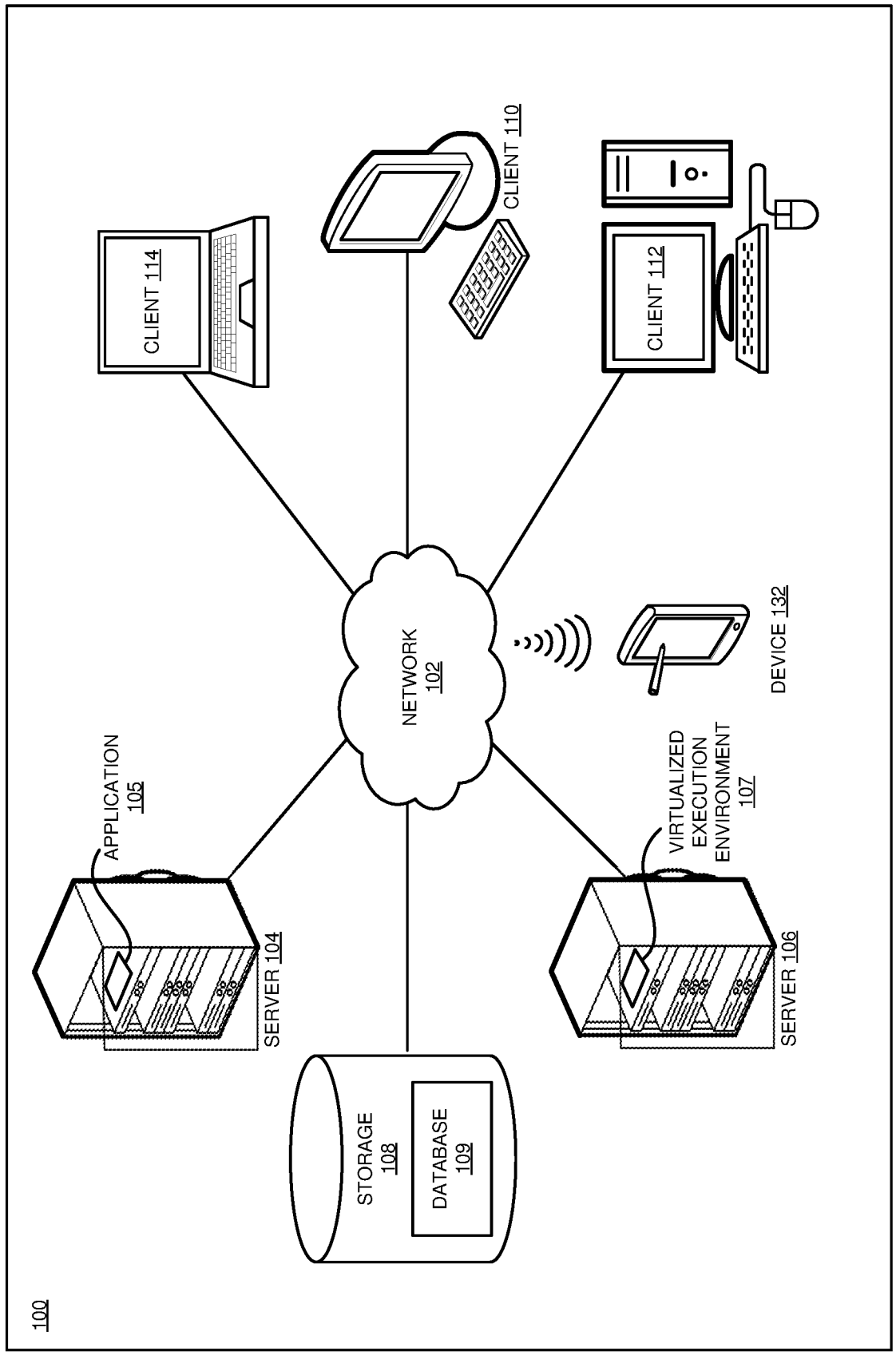
FIG. 1 depicts a block diagram of a network of data processing systems in which illustrative embodiments may be implemented.

The illustrative embodiments described herein are directed to managed runtime data marshaling for native code access using a thread local native buffer. One or more embodiments recognize that a major challenge with languages, such as managed runtime languages, operating in a virtualized execution environment is interfacing programs running in the language's virtualized execution environment with legacy native systems. The efficiency of these interfaces is critical to application performance in real-world settings. For Java™, the language supplied native interface, the Java Native Interface (JNI), is a programming framework that enables Java™ code running in a JVM to call and be called by native applications (e.g., programs specific to a hardware and operating system) and libraries written in other languages. For example, JNI enables programmers to write native methods to handle situations when an application cannot be written entirely in the Java™ programming language such as when the Java™ program cannot support platform-specific features or program libraries. JNI provides excellent safety and isolation for the JVM, but at a high runtime performance cost and a high development/maintenance cost due to the complexity of JNI and the complex data layout translations that are needed to facilitate interoperation.

The newer, Java Native Access (JNA) project simplifies some of the boilerplate required to use JNI, but uses the same basic communication mechanisms between native systems and Java™ applications. One or more embodiments recognize that both systems require the use of complex application programming interfaces (APIs) and careful orchestration of the interplay between the native code and the JVM. The situation is further complicated for systems that utilize a pricing model for the platform that charges customers for native code execution when running a Java application. Embodiments recognize that the JNI/JNA interface model is especially problematic in such environments since the marshalling of data to and from the JVM's protected execution environment is performed in native code and the customer is often charged for the use of this infrastructure. Embodiments further recognize that the crossing of JNI boundaries can induce context switches between specialty and general processors, increasing the transition performance cost. Embodiments recognize that the associated monetary and performance overhead are barriers to application migration to Java™, and other languages which employ virtual runtime environments, from legacy native systems.

One or more embodiments provide a mechanism for marshalling virtual machine data for access by native code in which the management of memory allocation for marshaled data is performed by managed runtime code (e.g., Java™) executing in the virtualized execution environment and the marshalling of data performed in the managed runtime code language rather than in native code. One or more embodiments allow for direct dispatch to and return from the called native code without additional virtual machine protection when the native code is trusted and well-behaved. Although various embodiments are described herein with respect to Java™, it should be understood that the principles described herein are not specific to Java™ and other embodiments may be directed to other languages hosted in virtualized runtime environments.

In one or more embodiments, a buffer data structure referred to as a thread local native buffer is created on demand with a portion of native memory for each thread of execution in the virtualized environment. In one or more embodiments, the thread local native buffer is a managed runtime object that allocates and manages access to a block of native memory outside of the managed runtime heap and so is not garbage collected or otherwise inspected by the runtime management systems of the virtual machine. In particular embodiments, the buffer provides an API which allows values to be read from and written to the native buffer at specified offsets by the managed runtime code. In a particular embodiment, the thread local native buffer is exploited to accelerate native interface, such as a JNI method execution, by first marshalling data from Java™ data structures into a thread local native buffer and then transferring control to native code which directly operates on the data in the thread local native buffer. In particular embodiments, the thread local native buffer is exploited to accelerate the marshalling of data from native code into Java™ data structures by having the native code first write the data to be transferred into the native memory of the thread local native buffer and then transferring control to the JVM which operates directly on the buffer or transcribes the data into objects managed by the JVM for further processing.

In an embodiment, the thread local native buffer is used to build an execution stack frame for a native method, having a calling convention to pass all arguments on the stack, by marshalling data from a managed runtime heap of the virtual machine into the thread local native buffer in an appropriate platform-specific format for the native execution environment. In one or more embodiments, the execution stack frame includes state information of an executing routine such as arguments, parameters values, and an indication of a return address back to the caller (i.e., the managed runtime code) of the native code. In the embodiment, the data in the thread local native buffer matches a layout for the system's native calling conventions and is used to directly execute the native method without any data marshaling or modification of the native module. In particular embodiments, complexity of building the execution stack frame is hidden behind a helper class which encapsulates the frame layout conventions of the native execution environment. In a particular embodiment, direct execution of the target method is achieved by recognizing calls to invoke the native method of the API in a just-in-time (JIT) compiler of the virtualized execution environment and jumping directly to the target native code with a stack pointer set to the start and/or end of the thread local native buffer as appropriate for the target platform.

In an embodiment, register passing conventions are accommodated by storing values for register parameters either in the native buffer ahead of the stack frame or in a separate side data structure. In the embodiment, a method invocation of the native method would load the register parameters into the correct registers and then jump to the native method using the stack frame built in the thread local native buffer. In the embodiment, a JIT compiler converts the invoke into a series of register loads followed by a direct jump to the native method thereby eliminating overhead of transitioning via the JVM. In the embodiment, return values are handled via a similar mechanism. An advantage of this approach is that the managed runtime code can more efficiently interact with the managed runtime heap such that marshaling data in the managed runtime code reduces marshalling overhead. In the embodiment, building a directly executable stack frame simplifies the transition of execution to trusted, well-behaved native code and permits native methods to be executed without modification or the addition of native interface boilerplate code.

In another embodiment, in a further optimization, the allocated buffer in the thread local native buffer class allocates memory using an appropriate stack pointer rather than allocating native heap memory to make the invocation of native functions even more efficient. In such an embodiment, the VM provides an API to request the stack allocation and data is written to the native stack rather than to a chunk of allocated native heap memory.

In one or more embodiments, the procedure described herein moves the cost of marshalling data from the VM to native code using managed runtime code within the VM. As a result, the code runs in a mode where the user is not directly charged for its execution thus making the migration of legacy systems to modern languages and environments financially attractive.

In one or more embodiments, the thread local native buffer described could also be applied to situations in which native data needs to be marshalled into managed runtime code objects by storing the native data into the buffer and using the same techniques to materialize the data into objects in the managed runtime code rather than materializing the objects from the native code.

An embodiment can be implemented as a software application. The application implementing an embodiment can be configured as a modification of an existing virtual machine and/or cloud computing system or platform, as a separate application that operates in conjunction with an existing virtual machine and/or cloud computing system or platform, a standalone application, or some combination thereof.

The illustrative embodiments are described with respect to certain types of tools and platforms, procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
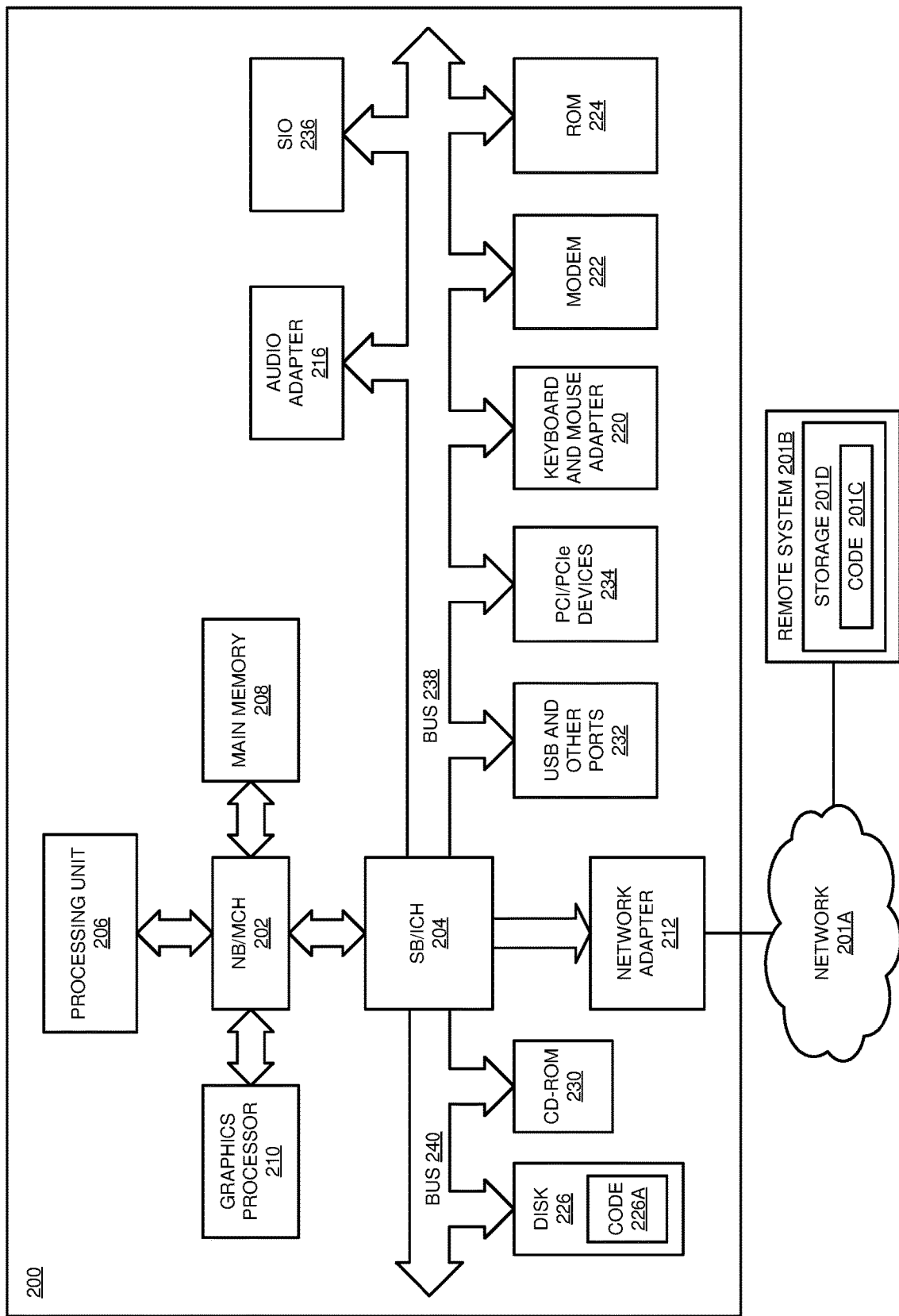
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for managed runtime data marshaling for native code access using a thread local native buffer in accordance with one or more embodiments.

Server 106 includes a virtualized execution environment 107 configured for running managed runtime code within a virtual machine as described herein with respect to various embodiments. Storage device 108 includes one or more databases 109 configured to store data associated with one or more components of data processing environment 100.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
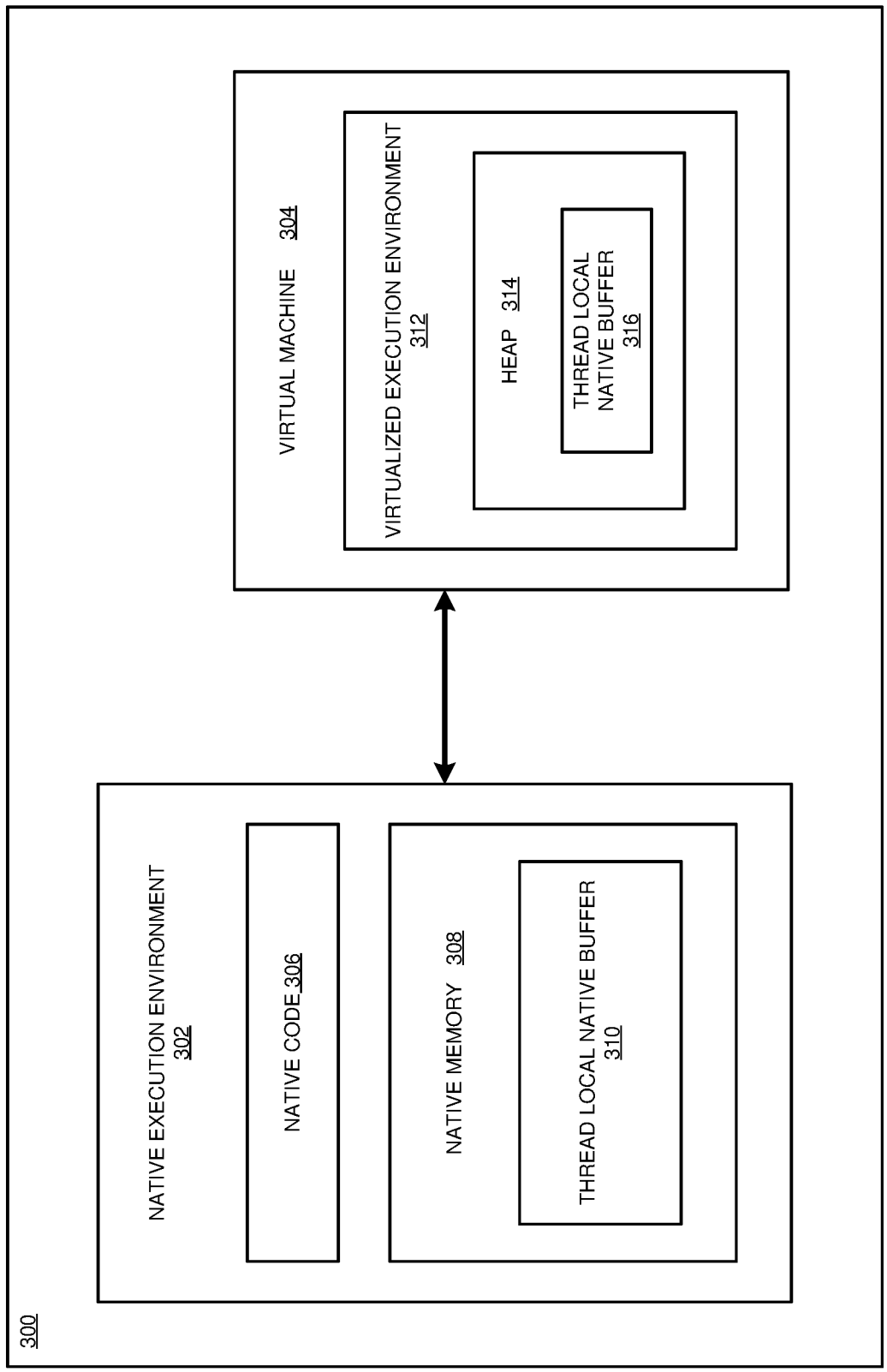
FIG. 3 depicts a block diagram of an example configuration for managed runtime data marshaling for native code access using a thread local native buffer in accordance with an illustrative embodiment.

With reference to FIG. 3, this figure depicts a block diagram of an example configuration 300 for managed runtime data marshaling for native code access using a thread local native buffer in accordance with an illustrative embodiment. The example embodiment includes a native execution environment 302 and a virtual machine 304. Native execution environment 302 includes native code 306 and a native memory 308. Native code 306 includes computer programming code that is operable to run with the particular hardware characteristics of native execution environment 302 such as a particular processor and a particular set of instructions native to the processor. In the embodiment, a portion of native memory 308 is configured to as a thread local native buffer 310 to perform one or more of the operations of a thread local native buffer as described herein with respect to certain embodiments.

Virtual machine 304 includes a virtualized execution environment 312 configured to run managed runtime code as described herein. Virtualized execution environment 312 includes a managed runtime heap 314 allocated within memory of virtualized execution environment 312. Managed runtime heap 314 stores one or more data structures, such as arrays and objects, associated with managed runtime code executing within virtualized execution environment 312. A thread local native buffer 316 is further configured in a portion of managed runtime heap 314. A thread local native buffer 316 incorporates as part of it representation a portion of native memory 310 allocated from the native memory 308 of native execution environment 302. In one or more embodiments, data within managed runtime heap 314 associated with a call by the managed runtime code to native code 306 is marshaled into thread local native buffer 310 as described herein with respect to one or more embodiments. In the embodiment, during execution of the managed runtime code and a call to native code 306 is made, virtual machine 304 passes control to native code 306. In the embodiment, native code 306 utilizes thread local native buffer 310 as memory during execution.

Figure 4:
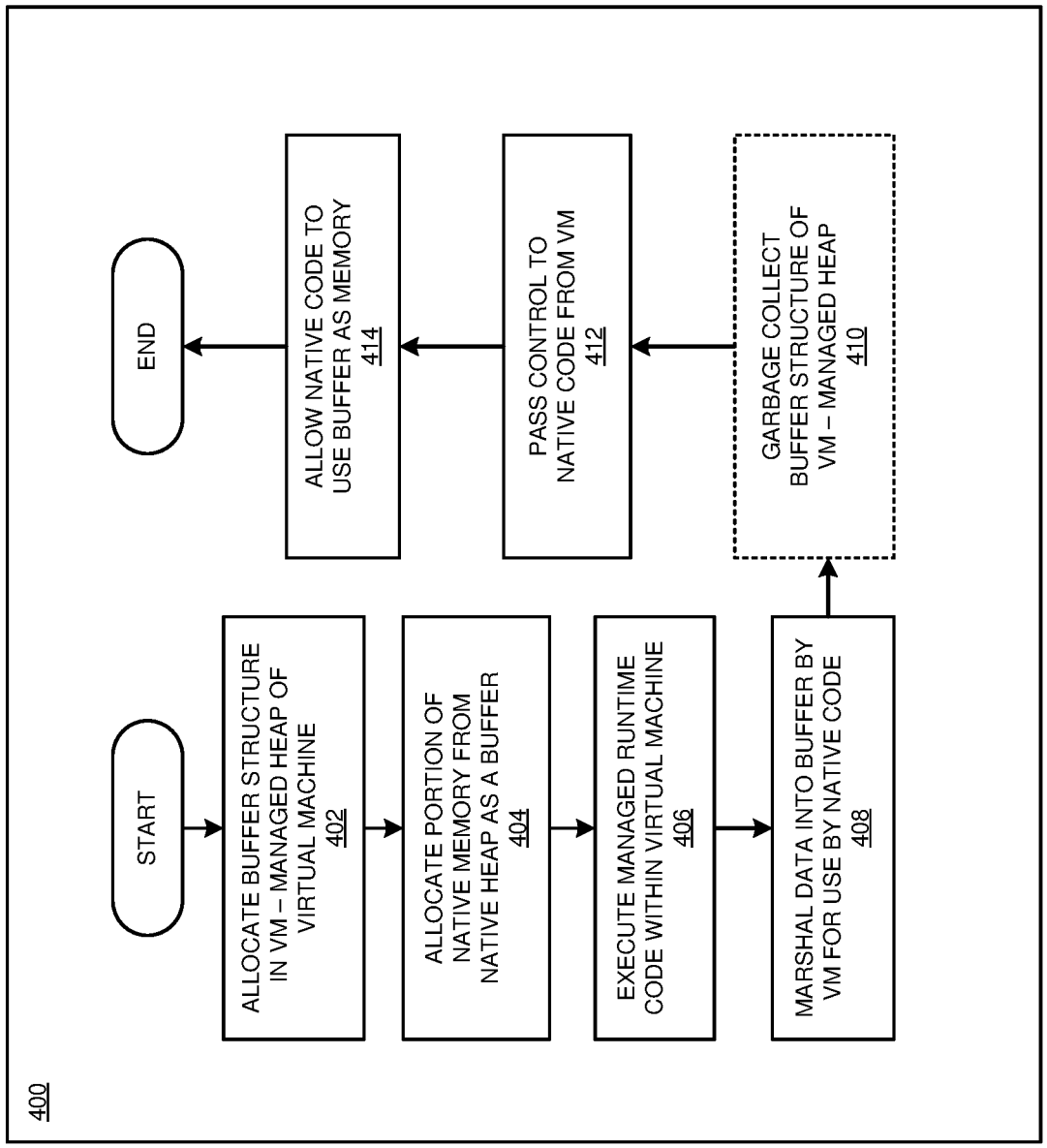
FIG. 4 depicts a flowchart of an example process for managed runtime data marshaling for native code access using a thread local native buffer in accordance with an illustrative embodiment.

With reference to FIG. 4, this figure depicts a flowchart of an example process 400 for managed runtime data marshaling for native code access using a thread local native buffer in accordance with an illustrative embodiment. In block 402, application 105 allocates a buffer structure in a VM-managed heap of a virtual machine to track and managed the native memory being used to send data to the native code. In block 404, application 105 allocates a portion of native memory from a native heap 308 as a thread local native buffer to store data for use by native code.

In block 406, the virtual machine executes managed runtime code within a managed runtime environment. In block 408, the virtual machine marshals data from the VM-managed heap 314 into the buffer in native memory 310 for use by the native code 306. In one or more embodiments, the virtual machine marshals the data from the VM-managed heap into the buffer in native memory in response to an API call to the native code within the managed runtime code. In a particular embodiment, the data is marshalled from the managed runtime heap 314 of the virtual machine 304 into the thread local native buffer 316 and 310 in a suitable platform-specific format for the native execution environment 302. In an embodiment, the thread local native buffer 316 converts the data in the managed runtime heap 314 and stores in its native memory buffer 310 to match a layout for the calling conventions of the native code 306.

In block 410, the virtual machine optionally garbage collects (e.g., compacts and/or modifies) the buffer structure of the VM-managed heap 314 of the virtual machine 304 according to virtual machine garbage collection procedures. In block 412, the virtual machine passes control to the native code 306. In block 414, the native code 306 reads and writes the marshaled data directly in the native portion of thread local native buffer 310. In particular embodiments, control is passed back to the managed runtime code of the virtual machine upon completion of execution of the native code. In an embodiment, native code 306 writes data to the native portion of thread local native buffer 310, and then calls the managed runtime code to provide, for example, an improvement in performance. In a particular embodiment, the native code writes a second data to the native portion of thread local native buffer 310, and native code 306 calls the managed runtime code. In the particular embodiment, the managed runtime code uses the API to at least one of read the second data or write to the second data. In another particular embodiment, the managed runtime code copies the second data into objects in VM-managed heap 314 for further processing. Process 400 then ends.

Figure 5:
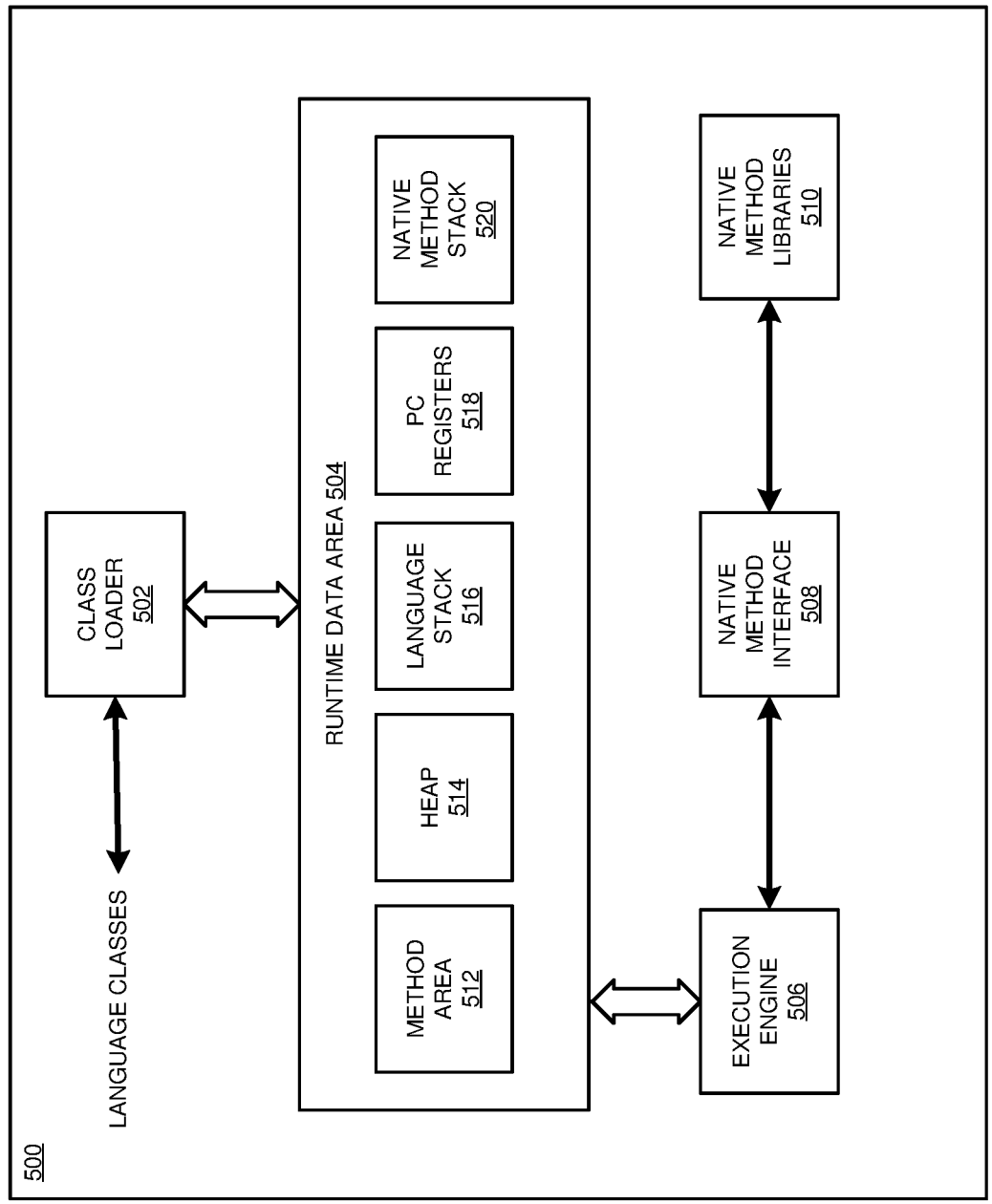
FIG. 5 depicts an example virtual machine architecture in accordance with an illustrative embodiment.

With reference to FIG. 5, this figure depicts an example virtual machine architecture 500 in accordance with an illustrative embodiment. VM architecture 500 includes a class loader 502, a runtime data area 504, and execution engine 506, a native method interface 508, and native method libraries 510. Runtime data area 504 further includes a method area 512, a heap 514, a language stack 516, PC registers 518, and a native method stack 520.

Class loader 502 is configured to load, link, and initialize language classes into runtime data area 504. Method area 512 is configured to store class level data including static variables associated with the virtual machine. Heap area 514 is configured to store objects and their corresponding instance variables and arrays. Language stack 516 is configured as a runtime stack configured for every thread in which for every method call an entry called a stack frame is made in the stack memory. The stack frame includes, for example, a local variable array, an operand stack, and frame data. PC registers 518 are configured to hold the address of a current executing instruction. Once the instruction is executed, PC registers 518 are updated with the next instruction. Native method stack 520 is configured to hold native method information.

Execution engine 506 executes code within runtime data area 504 and includes an interpreter to interpret the runtime, a JIT compiler, and a garbage collector to collect and remove unreferenced objects. Native method interface 508 is configured to interact with native method libraries 510 to provide a collection of native method libraries required by execution engine 506.

Figure 6:
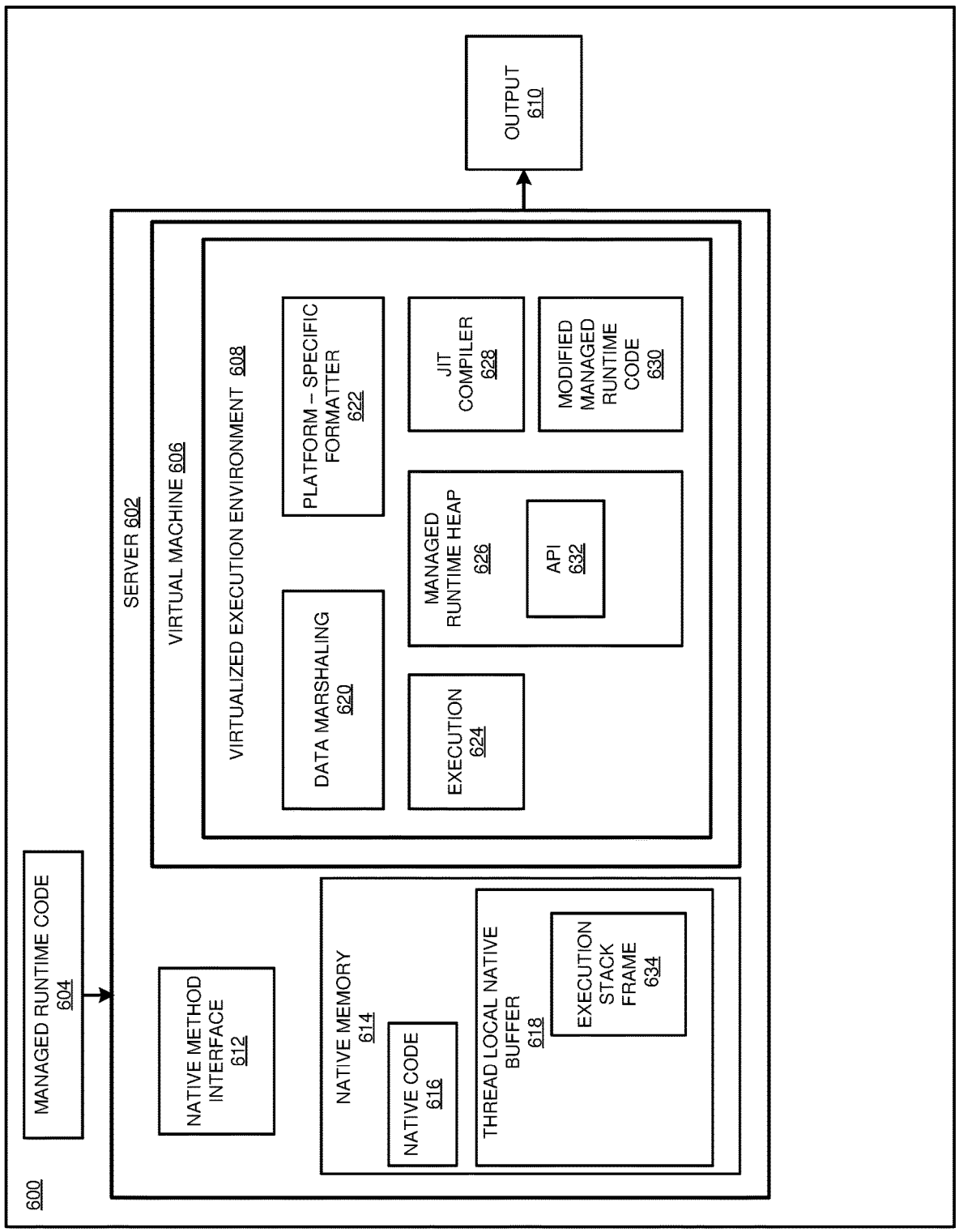
FIG. 6 depicts a block diagram of another example configuration for managed runtime data marshaling for native code access using a thread local native buffer in accordance with an illustrative embodiment.

With reference to FIG. 6, this figure depicts a block diagram of another example configuration 600 for managed runtime data marshaling for native code access using a thread local native buffer in accordance with an illustrative embodiment. The example embodiment includes a server 602 configured to received managed runtime code 604 and execute managed runtime code 604 in a virtualized execution environment 608. In the embodiment, execution of managed runtime code 604 produces an output 610. In particular embodiments, the functions of server 602 may be performed of one or more of server 104 or server 106.

Server 602 further includes a native method interface 612 and native memory 614. Native memory 614 is configured to store native code 616 and an allocated thread local native buffer 618. Thread local native buffer 618 further includes an execution stack frame 634. Native method interface 612 is configured to interact with virtual machine 606 to provide native method libraries to virtual machine 606 that may be required for execution of managed runtime code 604 by virtual machine 606. Native code 616 includes native code that is called by managed runtime code 604 during execution of managed runtime code 604. In particular embodiments, native code 616 includes legacy platform-specific code that is specific to the hardware and/or native software of the native system.

Execution stack frame 634 includes state information of an executing routine such as arguments, parameters values, a location to store the routine's return value, and an indication of a return address back to the caller (i.e., the managed runtime code) of the native code.

Virtualized execution environment 608 includes a data marshaling component 620, a platform-specific formatter 622, an execution component 624, a managed runtime heap 626, and a JIT compiler 628, and modified runtime code 630. Data marshaling component 620 is configured to marshal data from managed runtime heap 626 to thread local native buffer 618. In the illustrated embodiment, platform-specific formatter 622 is configured to format the data into a platform-specific execution stack frame 634 corresponding to native code 616 before as it is written to thread local native buffer 618. Execution component 624 is configured to execute managed runtime code 604 utilizing managed runtime heap 626 and JIT compiler 628. Modified managed runtime code 630 is produced as a result of running JIT compiler 628 on managed runtime code 604. The modified managed runtime code 630 uses the data marshalling API 632 stored in managed heap 626 to provide marshaled data to thread local native buffer 618 as further described herein with respect to certain embodiments.

In an embodiment, during execution of managed runtime code 604 by virtual machine 606, virtual machine 606 detects a call to native code 616 within managed runtime code 606 and transfers control to native code 616. In the embodiment, execution jumps to native code 616 with a stack pointer set to an execution stack frame 634 within thread local native buffer 618, and native code 616 is executed using the marshaled data contained therein. Upon completion of the execution of native code 616, control may be passed back to virtual machine 606 to resume execution of any remaining managed runtime code such as one or more of managed runtime code 604 or modified managed runtime code 630.

Figure 7:
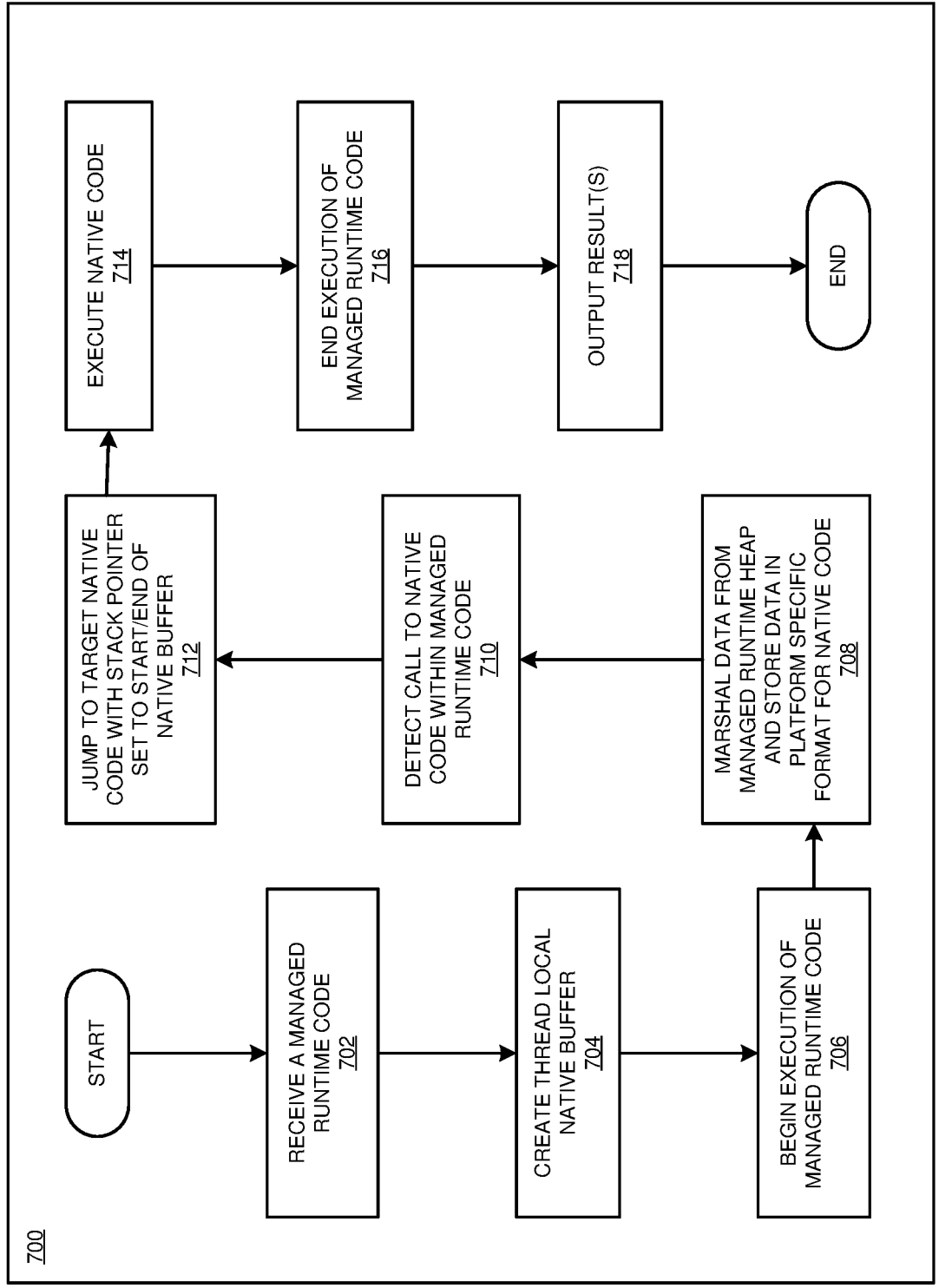
FIG. 7 depicts a flowchart of another example process for managed runtime data marshaling for native code access using a thread local native buffer in accordance with an illustrative embodiment.

With reference to FIG. 7, this figure depicts a flowchart of another example process 700 for managed runtime data marshaling for native code access using a thread local native buffer in accordance with an illustrative embodiment. In one or more embodiments, process 700 is performed using the system described with respect to FIG. 6.

In block 702, a system, such as server 602 receives managed runtime code 604. In one or more embodiments, the system includes one or more processors, a native execution environment, and a virtual machine including a virtualized execution environment. In the embodiment, the native execution environment includes native code 616 residing within a native memory 614 configured for executing a native method, and the virtual machine includes a managed runtime heap 626 for use by the virtual machine 606 when executing the managed runtime code 604. In block 704, the system creates a thread local native buffer API 632 in the managed runtime heap 626 as well as a reserving a portion of native memory 614 for use as a thread local native buffer 618. In block 708, the virtual machine begins execution of the managed runtime code.

In block 710, the virtual machine, as part of the execution of the managed runtime code, marshals data from managed runtime heap 626 of the virtual machine using platform-specific formatter 622 and stores the data in thread local native buffer within the native memory in a platform-specific format suitable for native code 616. In a particular embodiment, the platform-specific format matches calling conventions of native code 616.

In block 712, execution jumps to the target native code with a stack pointer set to a start and/or end of the native buffer. In block 714, the system executes the native code utilizing the thread local native buffer. After execution of the native code control passes back to the virtual machine to resume execution of any remaining managed runtime code by the virtual machine. In block 716, the virtual machine ends execution of the managed runtime code. In block 718, the system outputs one or more results of the execution of the managed runtime code and the native code. In alternative embodiments, the system may output results of the execution of the managed runtime code and the native code during the execution of one or more of the managed runtime code and the native code. Process 700 then ends.

Thus, a computer implemented method, system or apparatus, and computer program product are provided in the illustrative embodiments for managed runtime data marshaling for native code access using a thread local native buffer and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, the method comprising:
    configuring a portion of a native memory as a buffer within a native execution environment;
    initiating, by a virtual machine, execution of a managed runtime code;
    marshaling, by the virtual machine, data from a managed runtime memory heap of the virtual machine into the buffer, the marshaling comprising constructing an execution stack frame within the buffer, the execution stack frame including the marshalled data, the marshaled data including a return address in the managed runtime code, the return address comprising an address to which execution is to return upon transfer of execution from a native code to the managed runtime code;
    transferring control of execution from the managed runtime code to the native code;
    executing the native code, the native code operating directly upon the marshaled data in the buffer, the native code writing second data to the buffer;
    transferring control of execution from the native code to the return address in the managed runtime code; and
    executing the managed runtime code using the second data.

2. The computer-implemented method of claim 1, wherein the marshaling includes converting the data in the managed runtime memory heap to match a calling convention of a native code.

3. The computer-implemented method of claim 1, further comprising:
    detecting, by the virtual machine, a call to the native code within the managed runtime code.

4. The computer-implemented method of claim 3, wherein the detection is performed by a just-in-time compiler of the virtual machine.

5. The computer-implemented method of claim 1, further comprising:
    transferring control of execution from the native code to the managed runtime code.

6. The computer-implemented method of claim 1, further comprising:
    setting a stack pointer to one or more of a start of the buffer or an end of the buffer.

7. The computer-implemented method of claim 1, wherein the managed runtime memory includes an application programming interface (API) associated therewith, the API facilitating the marshaling of data between the virtual machine and the buffer.

8. The computer-implemented method of claim 7, further comprising:
    writing second data to a native portion of the buffer by the native code; and
    calling the managed runtime code from the native code, the managed runtime code using the API to at least one of read the second data or write to the second data.

9. The computer-implemented method of claim 1, wherein the native code executes within a native execution environment.

10. The computer-implemented method of claim 1, wherein the managed runtime code executes within a virtualized execution environment.

11. A computer usable program product comprising one or more computer-readable storage devices, and program instructions stored on at least one of the one or more storage devices, the stored program instructions comprising:
    program instructions to configure a portion of a native memory as a buffer within a native execution environment;
    program instructions to initiate, by a virtual machine, execution of a managed runtime code;
    program instruction to marshal, by the virtual machine, data from a managed runtime memory heap of the virtual machine into the buffer, the marshaling comprising constructing an execution stack frame within the buffer, the execution stack frame including the marshalled data, the marshaled data including a return address in the managed runtime code, the return address comprising an address to which execution is to return upon transfer of execution from a native code to the managed runtime code;
    program instructions to transfer control of execution from the managed runtime code to the native code;
    program instructions to execute the native code, the native code operating directly upon the marshaled data in the buffer, the native code writing second data to the buffer;
    program instructions to transfer control of execution from the native code to the return address in the managed runtime code; and
    program instructions to execute the managed runtime code using the second data.

12. The computer usable program product of claim 11, wherein the marshaling includes converting the data in the managed runtime memory heap to match a calling convention of a native code.

13. The computer usable program product of claim 11, further comprising:
    program instructions to detect, by the virtual machine, a call to the native code within the managed runtime code.

14. The computer usable program product of claim 13, wherein the detection is performed by a just-in-time compiler of the virtual machine.

15. The computer usable program product of claim 11, wherein the computer usable code is stored in a computer readable storage device in a data processing system, and wherein the computer usable code is transferred over a network from a remote data processing system.

16. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to configure a portion of a native memory as a buffer within a native execution environment;

program instructions to initiate, by a virtual machine, execution of a managed runtime code;

program instruction to marshal, by the virtual machine, data from a managed runtime memory heap of the virtual machine into the buffer, the marshaling comprising constructing an execution stack frame within the buffer, the execution stack frame including the marshalled data, the marshaled data including a return address in the managed runtime code, the return address comprising an address to which execution is to return upon transfer of execution from a native code to the managed runtime code;

program instructions to transfer control of execution from the managed runtime code to the native code;

program instructions to execute the native code, the native code operating directly upon the marshaled data in the buffer, the native code writing second data to the buffer;

program instructions to transfer control of execution from the native code to the return address in the managed runtime code; and program instructions to execute the managed runtime code using the second data.

\* \* \* \* \*